(12) United States Patent
Shen et al.

(10) Patent No.: US 11,347,913 B1
(45) Date of Patent: May 31, 2022

(54) METHOD OF RECONSTRUCTION OF POST-LAYOUT DESIGN FOR GRAPHICAL DISPLAY

(71) Applicant: CADENCE DESIGN SYSTEMS, INC., San Jose, CA (US)

(72) Inventors: Yanfei Shen, San Jose, CA (US); Qingyu Lin, Pleasanton, CA (US); Patrick O'Halloran, Santa Rosa, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 17/207,306

(22) Filed: Mar. 19, 2021

(51) Int. Cl.
| | | |
|---|---|---|
| *G06F 30/30* | (2020.01) | |
| *G06F 30/31* | (2020.01) | |
| *G06F 30/392* | (2020.01) | |
| *G06F 30/3308* | (2020.01) | |
| *G06F 30/398* | (2020.01) | |
| G06F 30/327 | (2020.01) | |
| G06F 111/02 | (2020.01) | |
| G06F 3/04842 | (2022.01) | |
| G06F 111/12 | (2020.01) | |

(52) U.S. Cl.
CPC .......... *G06F 30/31* (2020.01); *G06F 30/3308* (2020.01); *G06F 30/392* (2020.01); *G06F 30/398* (2020.01); *G06F 3/04842* (2013.01); *G06F 30/327* (2020.01); *G06F 2111/02* (2020.01); *G06F 2111/12* (2020.01)

(58) Field of Classification Search
None
See application file for complete search history.

(56) References Cited

U.S. PATENT DOCUMENTS

| | | | | |
|---|---|---|---|---|
| 10,521,535 | B2 * | 12/2019 | Oriordan | G06F 30/392 |
| 10,678,978 | B1 * | 6/2020 | Kukai | G06F 30/337 |
| 10,762,259 | B1 * | 9/2020 | Ershov | G06F 30/39 |
| 10,783,296 | B1 * | 9/2020 | Ershov | G06F 30/367 |
| 2015/0269297 | A1 * | 9/2015 | Tuan | G06F 30/367 |
| | | | | 716/106 |

* cited by examiner

*Primary Examiner* — Leigh M Garbowski
(74) *Attorney, Agent, or Firm* — Foley & Lardner LLP

(57) ABSTRACT

A method of reconstructing an emulated circuit layout for graphical display includes receiving a pre-layout circuit including one or more devices and one or more nodes. The method includes generating a Detailed Standard Parasitic Format (DPSF) netlist representing a post-layout circuit. The DPSF netlist includes a plurality of instances representing the one or more devices, the one or more nodes, and one or more parasitic elements not included in the pre-layout circuit. The method includes identifying at least one node of the one or more nodes that is associated with the one or more parasitic elements. The method includes updating the DPSF netlist to associate the one or more parasitic elements with the at least one node. The method includes constructing graphical representation of the post-layout circuit based on the updated DPSF netlist. The method includes causing a display device to display the graphical representation.

20 Claims, 7 Drawing Sheets

METHOD OF RECONSTRUCTION OF POST-LAYOUT DESIGN FOR GRAPHICAL DISPLAY

TECHNICAL FIELD

The present invention relates generally to the field of electronic circuits, and, more specifically, methods and systems for reconstruction of a post-layout electronic circuit design.

BACKGROUND

A semiconductor circuit (e.g., integrated circuit, printed circuit board) has a large number of logic devices and transistors that, when transitioned into a physical layout, may not perform ideally (e.g., exactly as designed) due to development of parasitic circuit elements such as capacitance or resistance caused by the physical structure of the integrated circuit. As such, when transitioning a circuit design to physical layout, it is imperative that the pre-layout circuit design is emulated using an emulation software program prior to fabrication in order to determine how the performance of the design will be impacted by parasitic elements. During emulation, a pre-layout circuit design (e.g., a schematic prior to determining layout of the integrated circuit) is flattened to create fabrication layers to be implemented in the integrated circuit or printed circuit, and the flattened design is emulated and reconstructed to display a graphical representation of the post-layout circuit schematic (e.g., after the physical layout of the integrated circuit is generated). However, when using a physical layout for a device such as a transistor, a circuit designer may opt for using a multi-finger transistor layout to reduce physical circuit size and improve device matching. As such, when reconstructed for graphical representation to a circuit designer for review, a post-layout circuit design includes repeated instances of a same logic device and any parasitic capacitances and resistances for which the pre-layout circuit schematic did not account.

This conventional approach for reconstructing the post-layout circuit to include multiple instances of a multi-fingered device and the parasitic elements produces a graphical representation inundated with additional elements not present in the pre-layout circuit, such that the pre-layout circuit elements are not readily apparent to the circuit designer reviewing the post-layout design. In addition, a multi-fingered device may be repeated throughout the pre-layout design hundreds or thousands of times; as such, when flattened to appear as its respective fingers, a post-layout design can appear to have tens of hundreds or thousands of instances of the logic device. In addition, any parasitic devices that occur in the physical layout also occur for each of the thousands of instances of transistors. This post-layout design requires extensive appear in the post-layout design that must be extensive review from the circuit designer to identify which elements are part of the original pre-layout circuit design and which are a result of emulation of the physical layout. This leads to wastage of both resources and time of the circuit designer. Therefore, there is a need in the art for methods and systems that address the above-mentioned drawbacks of the conventional method for reconstructing post-layout circuit designs.

SUMMARY

Disclosed herein are methods and systems that address the above issues and may provide a number of additional of alternative benefits as well. The embodiments described herein provide a new methodology of reconstructing a post-layout circuit from an emulated integrated circuit design to appear similar to a pre-layout counterpart. The new methodology is implemented by an emulation system in which parasitic elements present only in the post-layout circuit are identified and displayed as a separate block associated with a node present in both the pre-layout circuit and the post-layout circuit, and each finger of a multi-fingered device are identified and consolidated such that the post-layout circuit schematic appears the same as the pre-layout circuit schematic to a circuit designer reviewing the post-layout circuit, resulting in easier identification of the post-layout elements during review and quality assurance checks.

In one embodiment, a computer-implemented method of reconstructing an emulated circuit layout for a graphical display comprises generating, by a computer, from a physical circuit layout based on a pre-layout circuit, a post-layout circuit defined including a plurality of circuit elements and a plurality of nodes; generating, by the computer, a Detailed Standard Parasitic Format (DPSF) netlist representing the post-layout circuit, the DPSF netlist including individual instances for each circuit element of the plurality of circuit elements defined in terms of the plurality of nodes; identifying, by the computer, from the plurality of circuit elements, a set of parasitic elements associated with at least one node of the plurality of nodes; generating, by the computer, a first updated DSPF netlist to create a separate net including the set of parasitic elements associated with the at least one node; identifying, by the computer, from the plurality of circuit elements, individual instances of a same device associated with the at least one node; generating, by the computer, a second updated DSPF netlist to consolidate the individual instances into a single instance for the same device; reconstructing, by the computer, based on the second updated DSPF netlist, a hierarchy in which the net and the same device of the post-layout circuit are distributed; and generating, by the computer, a graphical representation of the reconstructed post-layout circuit for display on a display device.

In another embodiment, a system configured to reconstruct emulated circuit layouts comprises: at least one processor configured to: generate, from a physical circuit layout based on a pre-layout circuit, a post-layout circuit defined including a plurality of circuit elements and a plurality of nodes; generate a DPSF netlist representing the post-layout circuit, the DPSF netlist including individual instances for each circuit element of the plurality of circuit elements defined in terms of the plurality of nodes; identify, from the plurality of circuit elements, a set of parasitic elements associated with at least one node of the plurality of nodes; generate a first updated DSPF netlist to create a separate net including the set of parasitic elements associated with the at least one node; identify, from the plurality of circuit elements, individual instances of a same device associated with the at least one node; generate a second updated DSPF netlist to consolidate the individual instances into a single instance for the same device; reconstruct, based on the second updated DSPF netlist, a hierarchy in which the net and the same device of the post-layout circuit are distributed; and generate a graphical representation of the reconstructed post-layout circuit for display on a display device.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
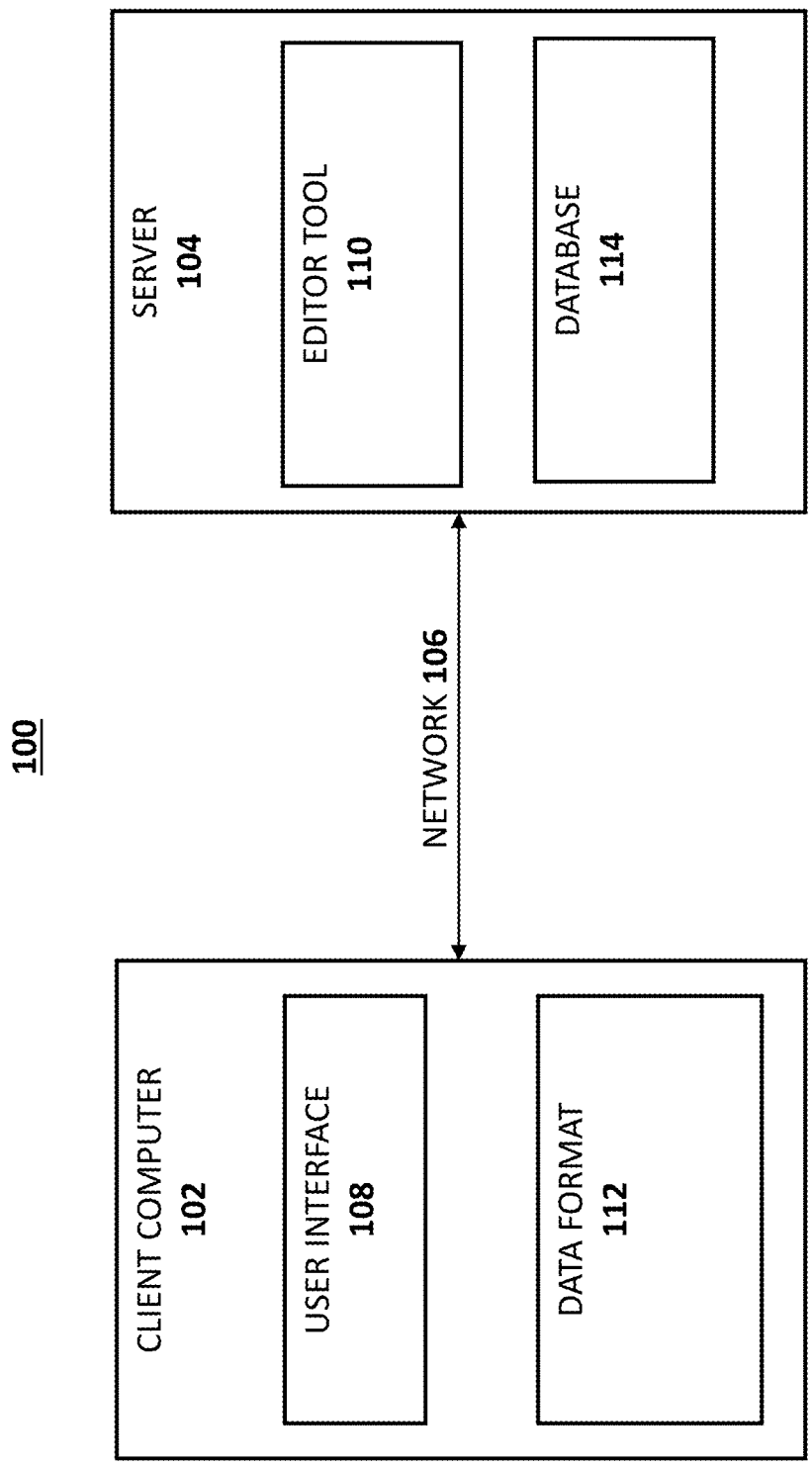
FIG. 1 illustrates various components for reviewing and editing an electronic circuit, according to an embodiment.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

The embodiments herein provide an improved method and system hosting emulation software for reconstructing graphical representations of post-layout circuits to appear similarly to their pre-layout counterparts for easier identification during review. The emulation software has an automated tool that receives a pre-layout circuit design and generates a physical layout for use in emulation chips. When the emulation software flattens the physical layout into blocks to generate a graphical representation of the physical layout, a post-layout circuit design is generated in Detailed Standard Parasitic Format (DSPF) netlist form, which captures parasitic elements not included in the pre-layout circuit and individual fingers of any multi-fingered devices as separate elements. The DSPF netlist is organized into instances, in which each finger of a multi-fingered device is denoted as such. The DSPF netlist also includes a set of parasitic elements. The software tool can identify a particular node of the multi-fingered device with which the parasitic elements are associated based on the netlist. The software tool may update the netlist to reflect the association, and construct a graphical representation of the post-layout circuit without the parasitic elements for display on a display device. The parasitic elements may be viewed in a pop-up box generated by hovering over or selecting a node of the graphical representation of the post-layout circuit having associated parasitic elements. Once the DSPF is updated to remove the individual instances of the parasitic elements, the software tool can consolidate each finger of the multi-fingered device into a single device associated with the node.

FIG. 1 illustrates various components 100 for reviewing and editing an electronic circuit, according to an embodiment. The components include a client computer 102 and a server 104. The client computer 102 may communicate with the server 104 via a network 106. The network 106 refers to a medium that also connects various computing devices. Examples of the network 106 include, but are not limited to, LAN, WLAN, MAN, WAN, and the Internet, as well as cloud-based computing networks and platforms. The communication over the network 106 may be performed in accordance with various communication protocols such as Transmission Control Protocol and Internet Protocol (TCP/IP), User Datagram Protocol (UDP), and IEEE communication protocols.

The server 104 is a computing device capable of communication with the client computer 102. The server 104 is accessible to the client computer 102 via the network 106. The server 104 may be a computing device including having a processor, a memory and software programmed to perform one or more operations like those described herein. The server 104 may be a computing device connected to a remotely located server location via a cloud connection. The server 104 can host a database 114 containing electronic circuit design components and design specifications relating to formation of an electronic circuit, such as a pre-layout circuit design. The server 104 can receive instructions from the client computer 102 via a user interface 108 to facilitate editing of a pre-layout circuit design stored in database 114. The server 104 includes an editor tool 110 that comprises a collection of software tools capable of implementing editing functions such as adding, deleting, revising, or otherwise affecting the electronic circuit from within the user interface 108. The editor tool 110 has access to the database 114 such that the editor tool 110 can create instances of circuit components stored within database 114. The electronic circuit designer of the client computer 102 uses the editor tool 110 to facilitate the editing of the electronic circuit. The user may interact with the editor tool 110 through a number of input devices, such as by inputting a selection as with a mouse or inputting a request as with a keyboard. The user may observe the response to the access request on an output device or display. The editor tool 110 may also run in an application window controlled by the user.

Figure 2:
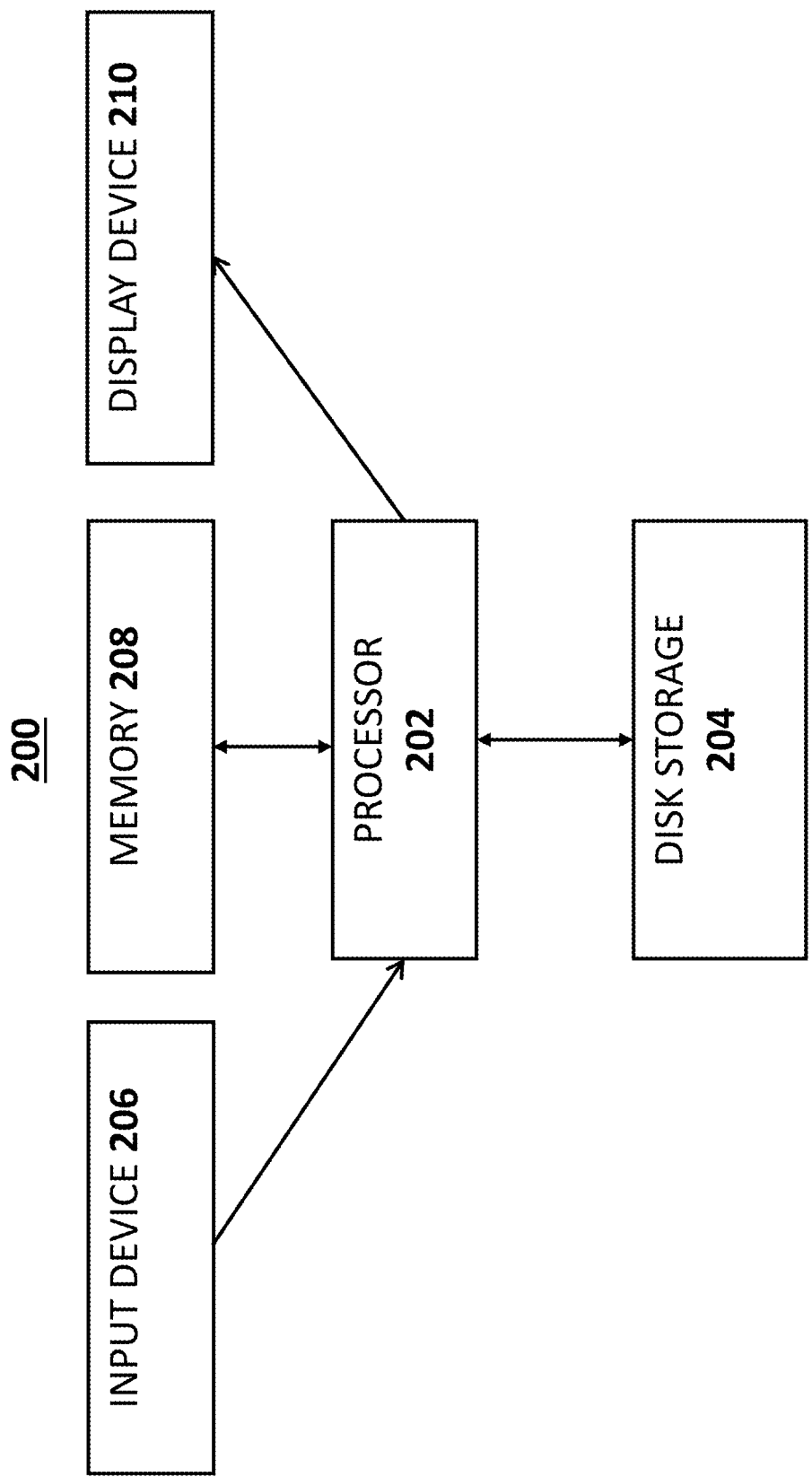
FIG. 2 illustrates a block diagram depicting components of an electronic circuit layout editing system, according to an embodiment.

FIG. 2 is a block diagram depicting components of an electronic circuit layout editing system 200, according to an embodiment. The system 200 includes a processor 202, disk storage 204, an input device 206, a memory 208, and a display device 210. In one implementation, all the components of system 200 may be connected via interconnect bus. In another implementation, the processor 202 and the disk storage 206 may be connected via a local microprocessor bus, and the remaining units of the system 200 may be connected via one or more input/output buses.

The processor 202 utilizes processing system to control the operations of the system 200. The processor 202 may include a single processor or a plurality of processors for configuring the system 200 as a multi-processor system. The processor 202 includes suitable logic, circuitry, and interfaces that are operable to execute one or more instructions to perform predetermined operations/tasks. The processor 202 can be realized through a number of processor technologies known in the art. Examples of the processor 202 include, but are not limited to, an x86 processor, an ARM processor, a Reduced Instruction Set Computing (RISC) processor, an Application-Specific Integrated Circuit (ASIC) processor, or a Complex Instruction Set Computing (CISC) processor.

The disk storage 204 is a non-volatile storage device for storing electronic circuit layouts and instructions, to be used by the processor 202. The disk storage 204 is implemented with a magnetic disk drive, an optical disk drive, a solid state device, or an attachment to network storage. The disk storage 204 may comprise one or more memory devices to facilitate storage and manipulation of program code, set of instructions, tasks, data, PDKs, and the like. Some of the commonly known disk storage 204 implementations include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory. Further, the disk storage 204 includes the one or more instructions that are executable by the processor(s) of the processor 202 to perform specific operations. The one or more instructions stored in the disk storage 204 can enable the processor 202 of the system 200 to perform the predetermined operations/tasks. The support circuits for the processor include cache, power supplies, clock circuits, data registers, I/O interfaces, and the like. The I/O interface may be directly coupled to the disk storage 204 or coupled to the processor 202.

The input device 206 may be a keyboard, mouse, pointer, or other input generating device to facilitate input of control instructions by the integrated circuit designer to the processor 202. In one embodiment, the input device 206 provides a portion of the user interface for the system 200, and may include an alphanumeric keypad for inputting alphanumeric and other key information along with a cursor control device such as a mouse, a track pad or stylus.

The memory 208 of the system 200 stores the software to load it to the disk storage 204. The memory 208 of the system 200 may also store instructions to be used by processor 202 to allow the electronic circuit designer access to the electronic circuits for viewing, editing, or maybe both. The display unit 210 of the system 200 may include a cathode ray tube (CRT) display, liquid crystal display (LCD), plasma, or active matrix organic light emitting diode display. In an embodiment, a graphics subsystem may receive textual and graphical information, and processes the information for output to the display unit 210. In one embodiment, the electronic circuit may be accessed by the electronic circuit designer by way of a graphical user interface or editor visualized by the display unit 210. The display unit 210 may also visualize a graphical user interface or the editor having a design mode and an edit mode to enable generation an editing of custom electronic circuit designs.

Figure 3:
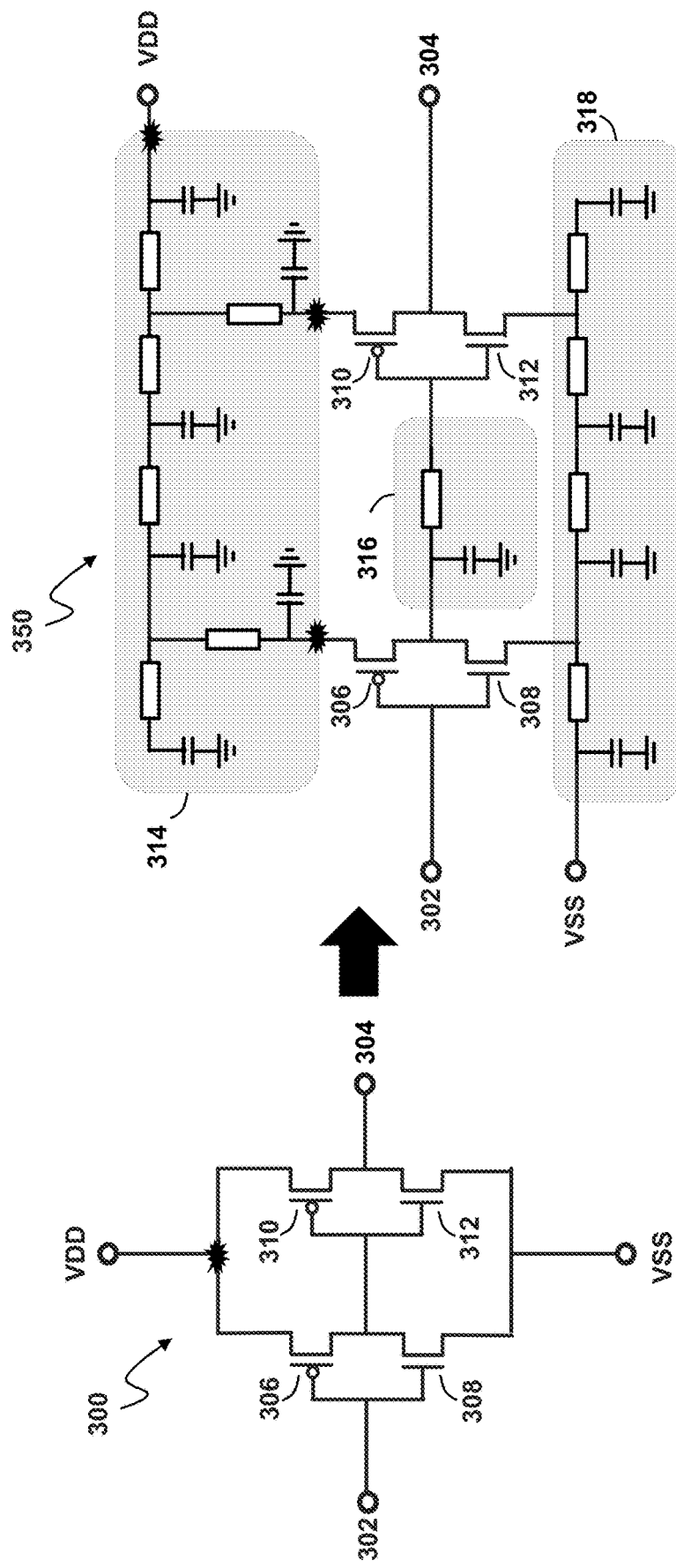
FIG. 3 illustrates a flow chart of reconstructing a pre-layout circuit from a post-layout circuit, according to an embodiment.

FIG. 3 illustrates an example reconstruction of a pre-layout circuit 300 and its post-layout counterpart, post-layout circuit 350. A processor hosting a software tool that such as that described with reference to FIGS. 1 and 2 receives pre-layout circuit 300 and generates a physical layout for emulation and testing. The physical layout, because of constraints such as size, materials, and the like can experience parasitic capacitance and resistance not accounted for in pre-layout circuit 300, and requires additional review and testing to ensure that operation of the pre-layout circuit 300 meets the original specifications of the design. When the layout generated from pre-layout circuit 300 is reconstructed, post-layout circuit 350 is created from a DSPF netlist created from the layout. It can be seen that both pre-layout circuit 300 and post-layout circuit 350 include an input node 302, an output node 304, a first CMOS gate including a PMOS transistor 306 and an NMOS transistor 308 and a second CMOS gate including a PMOS transistor 310 and an NMOS transistor 312 disposed between a supply voltage VDD and a ground voltage VSS. However, the post-layout circuit 350 includes a number of additional elements contained in a net 314, a net 316, and a net 318. The net 314 is disposed where a node previously connected PMOS transistor 306 PMOS transistor 310 to the supply voltage VDD. The net 316 is disposed where a node previously connected PMOS transistor 306, NMOS transistor 308, PMOS transistor 310, and NMOS transistor 312. The net 318 is disposed wherein a node previously connected NMOS transistor 308, NMOS transistor 312, and ground voltage VSS. The nets 314, 316, and 318 include parasitic devices present during operation caused by the physical layout of the circuit represented by pre-layout circuit 300 and post-layout circuit 350. These devices are inherent to the physical layout and require regeneration of the layout to be revised. Instead, a circuit designer will opt for revising the elements of post-layout circuit 350 to account for the parasitic devices contained in nets 314, 316, and 318. It will be appreciated that in integrated circuit designs including thousands of elements, a circuit designer does not know which elements of post-layout circuit 350 are part of the original design and which are parasitic devices.

Figure 4:
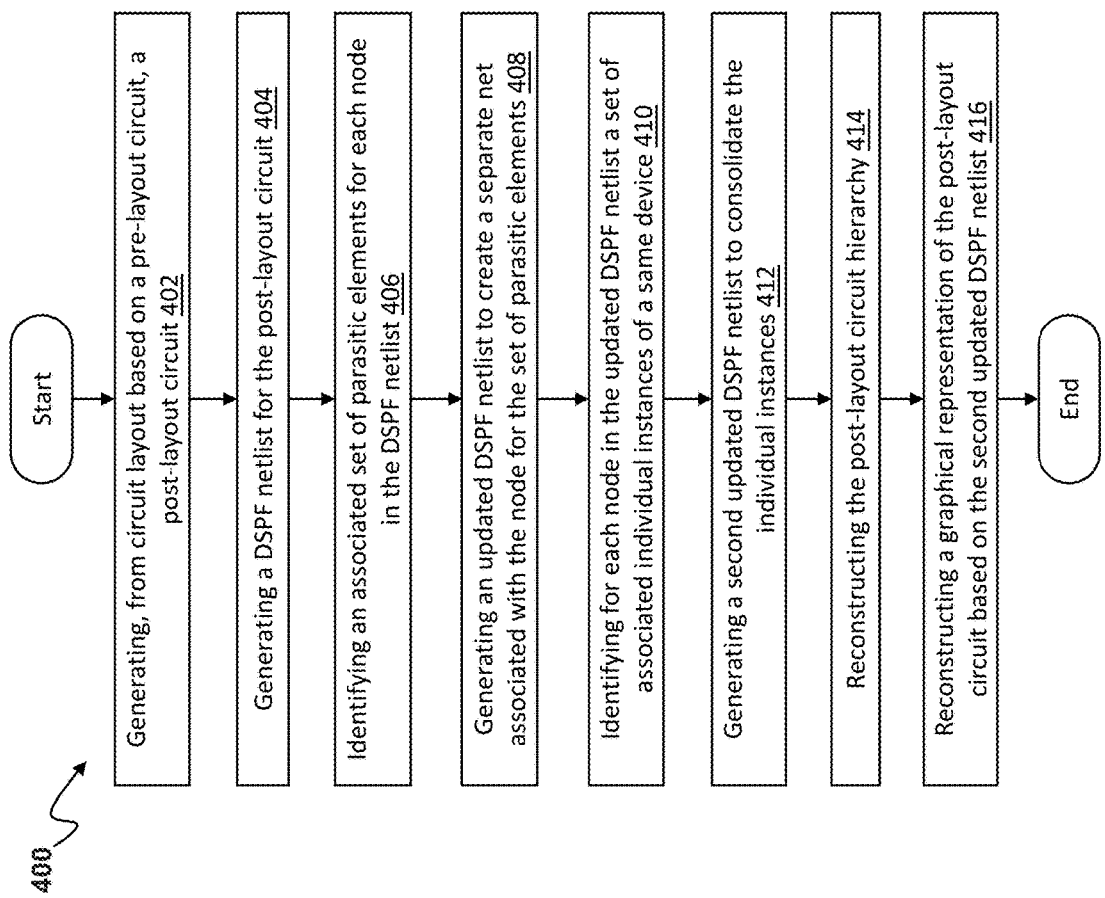
FIG. 4 illustrates a method of reconstructing a post-layout circuit similar to that of FIG. 3 to resemble its corresponding pre-layout circuit, according to an embodiment.

FIG. 4 illustrates a method 400 of reconstructing a post-layout circuit similar to that of FIG. 3 to resemble its corresponding pre-layout circuit, according to an embodiment. Method 400 is a processor-implemented method, and may be performed by a processor such as that described with reference to FIG. 2. Method 400 can begin automatically upon generating a post-layout circuit, or can be prompted by a user interacting with a user interface such as that described with reference to FIG. 1. FIGS. 5A through 5E illustrate the various method steps of method 400. For ease of description, each step of method 400 will be described with reference to the corresponding illustrations of FIGS. 5A through 5E.

Figures 5A, 5B:
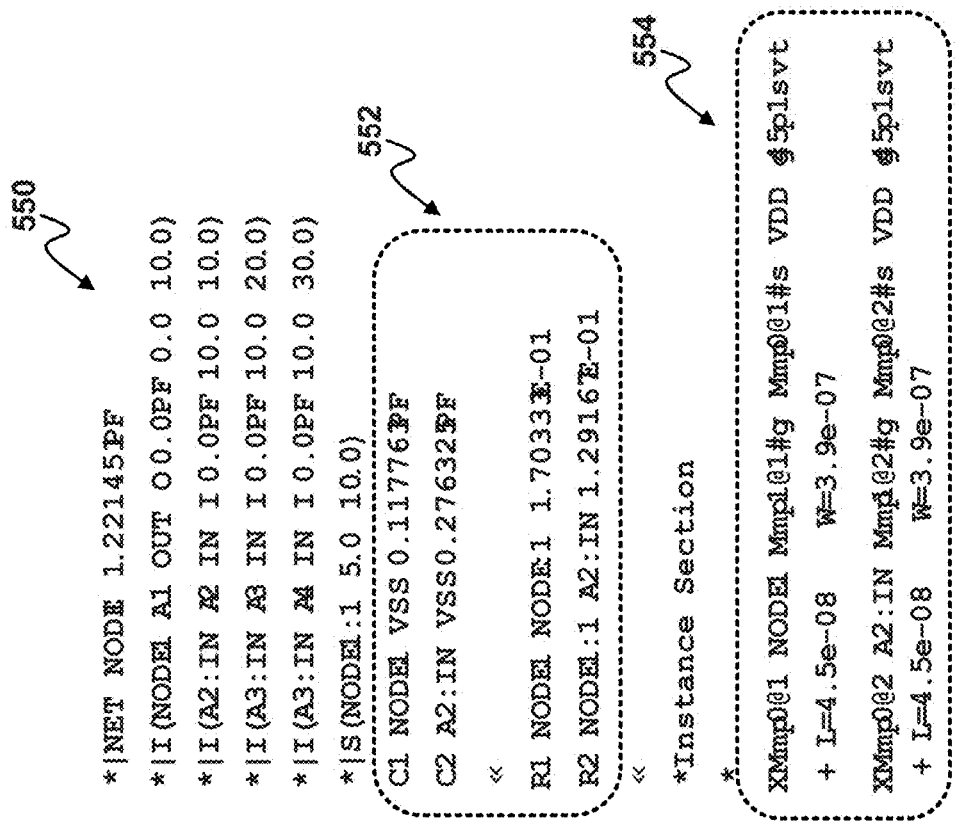
FIGS. 5A to 5F illustrate various method steps of the method in FIG. 4, according to an embodiment.

Method 400 begins with a step 402, in which a post-layout circuit is generated from a circuit layout based on a pre-layout circuit by the processor executing method 400. During step 402, the processor may receive a circuit layout of a pre-layout circuit design such as that described with reference to FIG. 3 and generate a post-layout circuit. Step 402 can be described with reference to FIG. 5A illustrating an example of a post-layout circuit 500. The post-layout circuit 500 includes a first finger 502_1 and a second finger 502_2 of a multi-fingered device included in the layout and a plurality of node definitions including a node NODE1 504, a node A2 506, a node A3 508, a node A4 510, and a node NODE1:1 512 defining a net 514.

Method 400 continues with a step 404, in which a DSPF netlist is generated for the post-layout circuit. To reconstruct the post-layout circuit 500 to be as close as the pre-layout design, the processor first obtains the list of all devices in the post-layout design 500 to be listed in DSPF format in the DSPF netlist. Step 404 is depicted in FIG. 5B illustrating a generated DSPF netlist 550. The DSPF netlist 550 includes a parasitics section 552 defining instances for each parasitic capacitance and resistance defined by the nodes to which they are connected in the post-layout circuit 500, and an instance section 554 including individual instances for each finger of a multi-fingered device defined by the nodes to which they are connected. DSPF netlist 550 has a naming convention for designating an existing hierarchy between each individual finger and the multi-fingered device to which it belongs as part of a larger scale logic device. For example, a first finger may be defined as XMmp0@1 and a second finger may be defined as XMmp0@2. Both fingers belong to a same logic device named XMmp0. DSPF netlist 550 also has a designation of "*|I" to indicate boundary conditions of a post-layout resistive-capacitive (RC) network.

Method 400 proceeds with a step 406, in which associated set of parasitic elements for each node in the net defined in the DSPF netlist is identified. During step 406, the processor reads the DSPF netlist to determine the boundary conditions defining the RC network. In doing so, the processor can identify a set of nodes defining an RC network in which a set of parasitic elements are contained. For example, net 514 of FIG. 5A illustrates an RC network comprised of a set of parasitic elements bounded by nodes NODE1 504, A2 506, A3 508, A4 510, and NODE1:1 512. As seen in the DSPF netlist 550, these nodes are indicated as part of net 514 by indicator "*||" preceding their definition in DSPF netlist 550. The set of parasitic elements (e.g., net 514) identified by the processor may be stored in a memory such as that described with reference to FIG. 2.

Figure 5D:
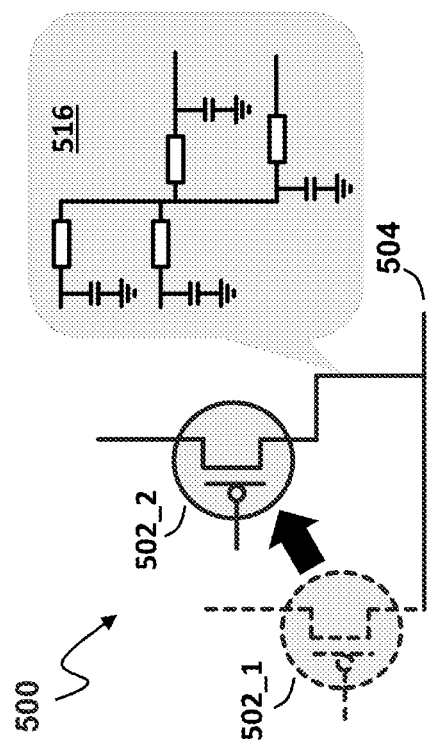
Figure 5C:
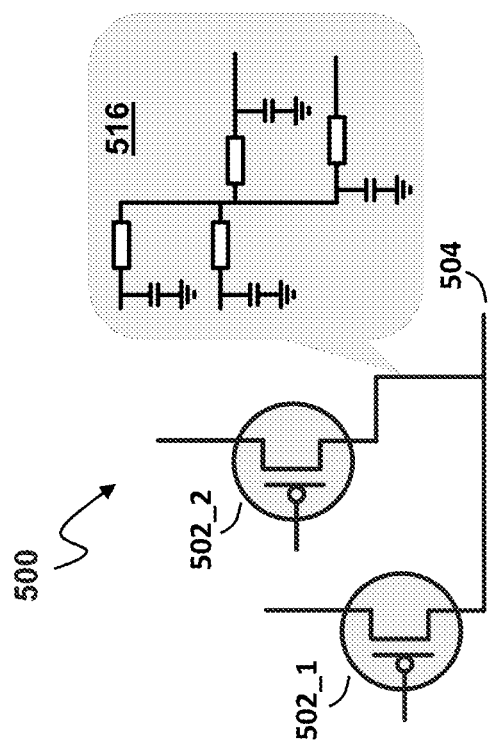

Method 400 proceeds with a step 408, in which the DSPF netlist 550 is updated by the processor to create a separate net associated with the node for the set of parasitic elements. Step 408 is illustrated in FIG. 5C, in which the RC network of net 514 including the parasitic elements is filtered out (e.g., separated) from the post-layout circuit 500 into its own net 516 associated with NODE1 504 as a result of updating the DSPF netlist 550. As part of step 408, the processor can set up net 516 in a hierarchical structure as a sub-block of a post-layout circuit 500, which can be accessed by interacting with post-layout circuit 500 in a user interface (such as that described with reference to FIGS. 1 and 2) to expand the circuit to display net 516. In such an embodiment, a circuit designer can select or hover over NODE1 504 to display net 516, as illustrated in FIG. 5C.

Method 400 continues with a step 410, in a set of associated individual instances of a same device are identified in the DSPF netlist. As part of step 410, the processor reviews the DSPF netlist 550 to identify instances of individual fingers of a multi-fingered device by analyzing the instance names. As noted above, the naming convention of the instances of each individual finger in the DSPF netlist 550 denotes the larger scale element to which the instance belongs and a number of the instance. For example, finger 502_1 may have a name of XMmp0@1 and finger 502_2 may have a name of XMmp0@2. The denotation of "@1" and "@2" marks each finger device as part of a larger device named XMmp0. The denotation "m" is an m-factor multiplier equal to the number of fingers, and the denotation "p" indicates the device is a PMOS transistor. This information may be collected by the processor and stored in the memory.

Method 400 continues with a step 412, in which the DSPF netlist is updated to consolidate the individual instances of the fingers into a single multi-fingered device. The processor uses the identification performed in step 410 to perform the consolidation. Since all parasitic resistors and capacitors are filtered out into net 516, the finger devices of the same pre-layout circuit are totally connected in parallel in the post-layout circuit 500. For exploring or debugging purposes, simply assume they can be merged together by adding the number of the device together with the m-factor equal to the number of fingers. Step 412 is illustrated in FIG. 5D, in which finger 502_1 and finger 502_2 are consolidated into a single multi-fingered transistor connected to NODE1 504.

Figure 5F:
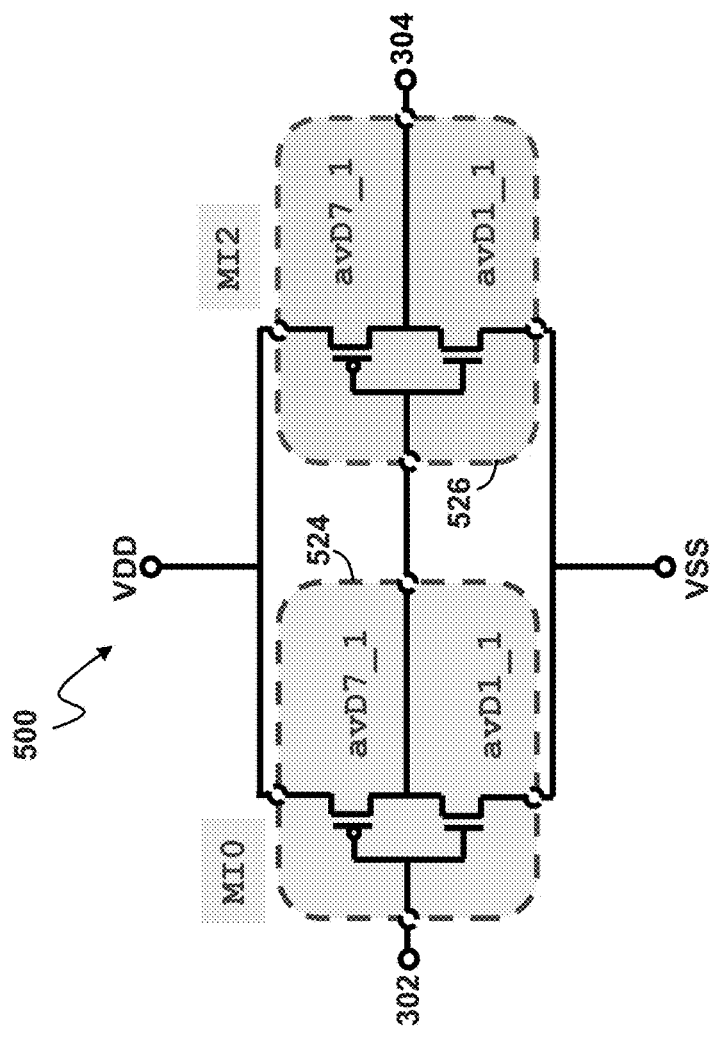
Figure 5E:
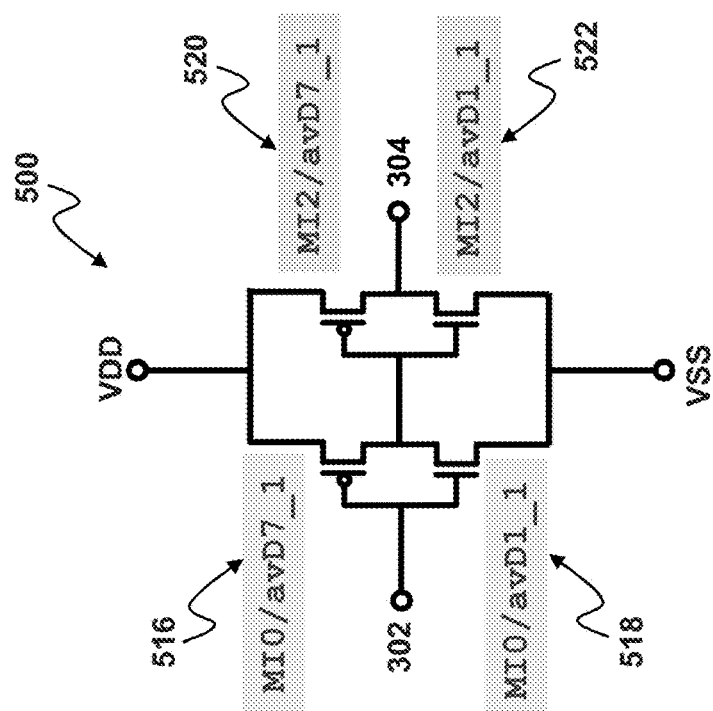

Steps 406-412 is repeated for each net and each multi-fingered device in post-layout circuit 500, resulting in a post-layout circuit similar in appearance to that of FIG. 5E. FIG. 5E illustrates the post-layout circuit 500 having a net 516 as described above associated with a first fingered device, and additional nets 518, 520, and 522 associated with each of the other three multi-fingered devices included in the post-layout circuit 500.

After filtering of the parasitic devices is completed in step 408 and consolidation of the fingers of a multi-fingered device occurs in step 412, method 400 continues with a step 414, in which the hierarchy of post-layout circuit 500 is reconstructed. Step 414 is illustrated in FIG. 5F. To properly reconstruct the hierarchy, each CMOS gate present in the post-layout circuit 500 should be treated as an individual block. As such, the processor groups the instances of multi-fingered devices associated with the first CMOS gate MI0 on the left in a first group, and groups the instance of multi-fingered devices associated with the second CMOS gate MI2 on the right in a second group. The hierarchy then is established by the processor as follows: a pair of CMOS gate blocks 524 and 526 on a top-most level that, when expanded, can each be seen to include a PMOS and an NMOS transistor. Each transistor in turn has a parasitic net contained in an additional block that can be expanded upon selection by a circuit designer. Thus, there are three levels of hierarchy: the top-most blocks 524 and 526 including a CMOS gate, a first sub-block including the individual components of the CMOS gate (e.g., finger devices 502_1 and 502_2), and a second sub-block contained in the first sub-block including a net (e.g., net 516) of parasitic elements associated with a node included in both top-most block and the first sub-block.

Method 400 may terminate with a step 416 in which a graphical representation of the reconstructed post-layout circuit 500 is generated based on the updated DSPF netlist. In the DSPF netlist 550, the hierarchy information is embedded in each device's name, which are recognized by the processor to group the devices into different instances. Based on the net boundaries determined in step 406, all devices can be connected, and the reconstructed post-layout design is ready for graphical display. The processor can generate the graphical representation based on the update DSPF netlist 550 and cause a display device (such as that described with reference to FIG. 1) to display the reconstructed post-layout circuit 500 via the user interface. Method 400 may terminate with step 414 and may repeat upon receiving a command from a circuit designer interacting with the user interface or upon receiving a new post-layout circuit design.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method of reconstructing an emulated circuit layout for a graphical display, the method comprising:
    generating, by a computer, from a physical circuit layout based on a pre-layout circuit, a post-layout circuit defined including a plurality of circuit elements and a plurality of nodes;
    generating, by the computer, a Detailed Standard Parasitic Format (DSPF) netlist representing the post-layout circuit, the DSPF netlist including individual instances for each circuit element of the plurality of circuit elements defined in terms of the plurality of nodes;
    identifying, by the computer, from the plurality of circuit elements, a set of parasitic elements associated with at least one node of the plurality of nodes;
    generating, by the computer, a first updated DSPF netlist to create a separate net including the set of parasitic elements associated with the at least one node;
    identifying, by the computer, from the plurality of circuit elements, individual instances of a same device associated with the at least one node;
    generating, by the computer, a second updated DSPF netlist to consolidate the individual instances into a single instance for the same device;
    reconstructing, by the computer, based on the second updated DSPF netlist, a hierarchy in which the net and the same device of the post-layout circuit are distributed; and
    generating, by the computer, a graphical representation of the reconstructed post-layout circuit for display on a display device.

2. The method of claim 1, wherein the hierarchy comprises:
    a top level including the at least one node of the post-layout circuit;
    a first sub level including the individual instances of the same device associated with the at least one node; and
    a second sub level including the separate net associated with the at least one node.

3. The method of claim 2, wherein the graphical representation of the post-layout circuit is a circuit topology, and further comprising:
    responsive to receiving a selection of a first circuit block including the same device disposed within the top level, updating, by the computer, the graphical representation to display the first sub level of the post-layout circuit.

4. The method of claim 3, further comprising:
    responsive to receiving selection of second circuit block including the separate net disposed within the first sub level, updating, by the computer, the graphical representation to display the second sub level of the post-layout circuit.

5. The method of claim 1, wherein the plurality of circuit elements comprises transistors, capacitors, and resistors.

6. The method of claim 1, wherein the same device is a multi-fingered device, and the individual instances are individual fingers of the multi-fingered device.

7. The method of claim 1, further comprising:
    responsive to determining that an operator is hovering over the at least one node, updating, by the computer, the graphical representation to display a pop-up including the one or more parasitic elements.

8. The method of claim 1, further comprising:
    responsive to determining that an operator is hovering over the same device, updating, by the computer, the graphical representation to display a pop-up including the individual instances of the same device.

9. The method of claim 1, wherein identifying a set of parasitic elements associated with the at least one node occurs responsive to receiving a command to filter out parasitic elements from the post-layout circuit.

10. The method of claim 1, wherein identifying the individual instances of the same device associated with the at least one node occurs responsive to receiving a command to consolidate repeated instances of same devices in the post-layout circuit.

11. A system configured to reconstruct emulated circuit layouts, comprising:
   at least one processor configured to:
   generate, from a physical circuit layout based on a pre-layout circuit, a post-layout circuit defined including a plurality of circuit elements and a plurality of nodes;
   generate a Detailed Standard Parasitic Format (DSPF) netlist representing the post-layout circuit, the DSPF netlist including individual instances for each circuit element of the plurality of circuit elements defined in terms of the plurality of nodes;
   identify, from the plurality of circuit elements, a set of parasitic elements associated with at least one node of the plurality of nodes;
   generate a first updated DSPF netlist to create a separate net including the set of parasitic elements associated with the at least one node;
   identify, from the plurality of circuit elements, individual instances of a same device associated with the at least one node;
   generate a second updated DSPF netlist to consolidate the individual instances into a single instance for the same device;
   reconstruct, based on the second updated DSPF netlist, a hierarchy in which the net and the same device of the post-layout circuit are distributed; and
   generate a graphical representation of the reconstructed post-layout circuit for display on a display device.

12. The system of claim 11, wherein the hierarchy comprises:
   a top level including the at least one node of the post-layout circuit;
   a first sub level including the individual instances of the same device associated with the at least one node; and
   a second sub level including the separate net associated with the at least one node.

13. The system of claim 12, wherein the graphical representation of the post-layout circuit is a circuit topology, and
   wherein the processor is further configured to update, responsive to receiving a selection of a first circuit block including the same device disposed within the top level, the graphical representation to display the first sub level of the post-layout circuit.

14. The system of claim 13, wherein the processor is further configured to update, responsive to receiving selection of second circuit block including the separate net disposed within the first sub level, the graphical representation to display the second sub level of the post-layout circuit.

15. The system of claim 11, wherein the plurality of circuit elements comprises transistors, capacitors, and resistors.

16. The system of claim 11, wherein the same device is a multi-fingered device, and the individual instances are individual fingers of the multi-fingered device.

17. The system of claim 11, wherein the processor is further configured to update, responsive to determining that an operator is hovering over the at least one node, the graphical representation to display a pop-up including the one or more parasitic elements.

18. The system of claim 11, wherein the processor is further configured to update, responsive to determining that an operator is hovering over the same device, the graphical representation to display a pop-up including the individual instances of the same device.

19. The system of claim 11, wherein the processor is configured to identify the set of parasitic elements associated with the at least one node occurs responsive to receiving a command to filter out parasitic elements from the post-layout circuit.

20. The system of claim 11, wherein the processor is configured to identify the individual instances of the same device associated with the at least one node occurs responsive to receiving a command to consolidate repeated instances of same devices in the post-layout circuit.

* * * * *